United States Patent Office 3,642,867
Patented Feb. 15, 1972

3,642,867
PROCESS FOR THE PREPARATION OF A 1,2-BIS(4-CARBOALKOXYPHENOXY)ETHANE
Saburo Senoo, Tokyo, Toshio Kato, Omiya, Norio Imai, Tokyo, and Masakazu Kurihara, Ageo, Japan, assignors to Asahi Kasei Kogyo Kabushiki Kaisha, Osaka, Japan
No Drawing. Filed Mar. 20, 1969, Ser. No. 809,014
Claims priority, application Japan, Apr. 26, 1968, 43/27,669; May 8, 1968, 43/30,275
Int. Cl. C07c 69/78
U.S. Cl. 260—473 S    8 Claims

ABSTRACT OF THE DISCLOSURE

This invention discloses a process for the preparation of a 1,2-bis(4-carboalkoxyphenoxy)ethane by the reaction of an alkali metal salt of a p-hydroxybenzoic acid alkyl ester with ethylene dichloride characterized in that said reaction is initiated in the absence of a solvent or said reaction is initiated in the presence of a solvent selected from the group consisting of a p-hydroxybenzoic acid alkyl ester (2-chloroethoxy)benzoic acid alkyl ester and 1,2-bis(4-carboalkoxyphenoxy)ethane, said solvent being employed alone or in combination. The rate of said reaction as well as the yield is improved by additionally employing copper as a catalyst. Thereby, it is possible to obtain 1,2-bis(4-carboalkoxyphenoxy)ethane in high yield with high selectivity, as compared with the conventional process in which an alcoholic solvent is employed. The 1,2-bis(4-carboalkoxyphenoxy)ethane is used for the production of a polyester or polyamide useful for a synthetic fibre or plastics.

---

This invention relates to a process for the preparation of a 1,2-bis(4-carboalkoxyphenoxy)ethane. More particularly this invention relates to a process for the preparation of a 1,2-bis(4-carboalkoxyphenoxy)ethane by the reaction of an alkali metal salt of a p-hydroxybenzoic acid alkyl ester with ethylene dichloride characterized in that said reaction is initiated in the absence of a solvent or said reaction is initiated in the presence of a solvent selected from the group consisting of a p-hydroxybenzoic acid alkyl ester, (2-chloroethoxy) benzoic acid alkyl ester and 2,2 - bis(4-carboalkoxyphenoxy)ethane, said solvent being employed alone or in combination, or characterized in that metal copper alone or a metallic composition containing metal copper is additionally employed as a catalyst, if desired.

Heretofore the reaction of anhydrous alkali metal salt of a p-hydroxybenzoic acid alkyl ester with an ethylene dihalide has been generally utilized in the manufacture of a 1,2-bis(4-carboalkoxyphenoxy)ethane (J. Org. Chem., 26, 474 (1961). It has been reported that this reaction can preferably be conducted by employing an alcohol as a solvent. However, as a result of the inventors' experiments in which the reaction was carried out in methanol by employing, as an ethylene dihalide, ethylene dichloride at 100 to 200° C. under pressure, it has been found that the yield in this reaction is at most approximately 55%. The principal reason for such low yield in this reaction resides in the fact that the reaction is accompanied by the liberation of a hydrogen halide from an ethylene dihalide to form a vinyl halide because of the strong alkalinity of an alkali metal salt of a p-hydroxybenzoic acid alkyl ester employed as a raw material. This side reaction is represented by the following schema:

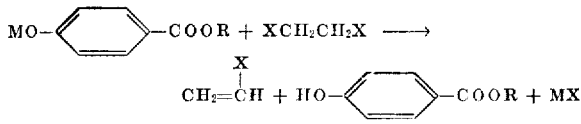

wherein M represents an alkali metal, R represents a lower alkyl group having 1 to 5 carbon atoms and X represents a halogen atom. The other disadvantage of the method employing an alcoholic solvent lies in the occurrence of the decomposition, during the reaction, of an alkali metal salt of a p-hydroxybenzoic acid alkyl ester employed as a raw material. Since the reaction rate is in general low, it is required to raise the reaction temperature in order for the reaction to proceed with advantage. However, the elevation of the reaction temperature is followed by the unfavorable formation of a considerable amount of phenol as a by-product. In the following Table 1 is shown the stability in methanol of a sodium salt of methyl p-hydroxybenzoate in terms of the formation rate of phenol in relation to temperature.

TABLE 1

| Temperature: | Formation rate of phenol (percent) |
|---|---|
| 160° C. | 8.0 |
| 180° C. | 25.0 |
| 200° C. | 81.5 |

(Heat treatment period: 5.5 hours)

As is apparent from the above Table 1, the formation rate of phenol is extremely increased at a temperature higher than 160° C.

The formation of phenol during the course of reaction not only lowers the selectivity to the desired product but also leads to the secondary formation of 1-(4-carboalkoxyphenoxy) - 2 - phenoxyethane as well as 1,2 - bis-(phenoxy)ethane, causing the isolation and purification of the desired product to be complicated and difficult. Furthermore, the formation of 4 - (2 - alkoxyethyloxy) benzoic acid alkyl ester as a by-product in the reaction effected by employing an alcoholic solvent is also not negligible.

As a result of the intensive study made by the inventors for the purpose of overcoming the above-mentioned drawbacks which accompany the conventional reaction, it has been found that, by initiating the reaction in the absence of a solvent, or more preferably by initiating the reaction in the presence of a solvent selected from the group consisting of p-hydroxybenzoic acid alkyl ester, (2-chloroethoxy)benzoic acid alkyl ester and 1,2-bis(4-carboalkoxyphenoxy)ethane which are a reaction by-product, a reaction intermediate and a desired product, respectively, said solvent being employed alone or in combination, the aforementioned side reactions can be depressed to an extent as high as possible, enabling the desired product to be obtained in high yield with high selectivity. The present invention has been made on the basis of such novel finding.

According to the present invention, there is provided a process for the preparation of 1,2 - bis(4 - carboalkoxyphenoxy) ethane represented by the general formula

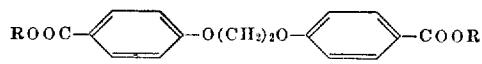

wherein R represents a lower alkyl group having 1 to 5 carbon atoms by the reaction of an alkali metal salt of a p-hydroxybenzoic acid alkyl ester represented by the general formula

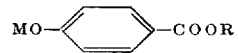

wherein R has the same meaning as defined above and M represents an alkali metal atom such as sodium, potassium or lithium atom with ethylene dichloride of the formula

characterized in that said reaction is initiated in the absence of a solvent or in that said reaction is initiated in the presence of a solvent selected from the group consisting of a p-hydroxybenzoic acid alkyl ester represented by the general formula

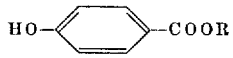

wherein R has the same meaning as defined above, a (2-chloroethoxy)benzoic acid alkyl ester represented by the general formula

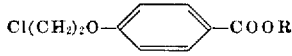

wherein R has the same meaning as defined above and a 1,2-bis(4-carboalkoxyphenoxy)ethane represented by the general formula

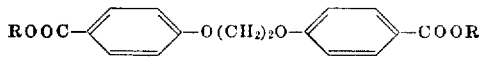

wherein R has the same meaning as defined above, said solvent being employed alone or in combination. Thereby, the drawbacks of the conventional methods are overcome and the desired product can be produced in a yield of 65 to 75% with a selectivity of more than 95%. The molar ratio of an alkali metal salt of a p-hydroxybenzoic acid alkyl ester to ethylene dichloride may be that based on the equivalent relation, namely 2:1, but the molar ratio of 2:about 1.2 is more preferably employed. Moreover it is to be noted that the additional employment of metal copper or a metallic composition containing metal copper as a catalyst in said reaction enables the yield to be improved by approximately 10%. Examples of the metallic compositions containing metal copper are bronze, Devarda's alloy and the like. The metal copper or metallic composition employed as a catalyst in the process of the present invention may be employed in an amount in the range of 0.01 to 100% by weight, more preferably in the range of 0.1 to 10% by weight, based on the amount of an alkali metal salt of a p-hydroxybenzoic acid alkyl ester.

Although, still in the process of the present invention, the formation of vinyl chloride as well as a free p-hydroxybenzoic acid alkyl ester as by-product can not be avoided as in the process employing an alcoholic solvent, the rate of the formation of such by-products is considerably small as compared with that of conventional processes. The free p-hydroxybenzoic acid alkyl ester can be nearly quantitatively recovered after the reaction, and reused or recycled via the conversion to the alkali metal salt thereof. In this connection, it should be noted that the above-mentioned value of selectivity has been obtained by taking account of such recovery of p-hydroxybenzoic acid alkyl ester.

As mentioned above, the present invention can be practised in such a manner that the reaction is initiated in the absence of solvent or that the reaction is initiated in the presence of the above-mentioned solvent. In the former case in which no solvent is initially employed, although ethylene dichloride and an alkali metal salt of a p-hydroxybenzoic acid alkyl ester do utterly not react with each other at a temperature below 100° C., they begin to react, in the range of high temperature, after the inductive stage in which the reaction rate is exceedingly low and, thereafter, the reaction proceeds with substantially the same reaction rate as in the reaction effected by employing the solvent (refer to Table 2).

TABLE 2

| Reaction time (hr.): | Yield (percent) |
|---|---|
| 1 | 1.2 |
| 2 | 2.2 |
| 3 | 7.2 |
| 4 | 42.7 |
| 5 | 58.0 |
| 6 | 66.3 |

(sodium salt of methyl p-hydroxybenzoate 0.05 mol.: ethylene dichloride 0.025 mol.: reaction temperature 160° C.).

The mechanism of this reaction can be understood as follows. In the course of the reaction are formed and accumulated a p-hydroxybenzoic acid alkyl ester, (2-chloroethoxy)benzoic acid alkyl ester and 1,2-bis(4-carboalkoxyphenoxy)ethane which are a by-product, intermediate and desired product, respectively, and they function as solvent or medium for the reaction, thereby causing the reaction to rapidly proceed. In this sense, the former case in which the reaction is initiated in the absence of solvent and the latter case in which the reaction is initiated in the presence of the above-mentioned solvent are essentially the same with each other. In this connection, however, it is noted that the reaction of the former case in which no solvent is initially employed needs a considerably long period of time in the inductive stage of reaction in comparison with that of the latter case in which the solvent is employed, as is apparent from the above Table 2 in view of Table 3 given shortly.

In the process of this invention, an alkali metal salt of a p-hydroxybenzoic acid alkyl ester employed as a raw material is exceedingly stable in the reaction at a high temperature and there is scarcely any formation of phenol. This fact can be proved by the experiments in which an alkali metal salt of a p-hydroxybenzoic acid alkyl ester is heated at 160° C., 180° C. and 200° C. in the absence or presence of a solvent such as p-hydroxybenzoic acid alkyl ester or 1,2-bis(4-carboalkoxyphenoxy)ethane. The reason why the selectivity is, according to the present invention, so high as mentioned hereinbefore resides in the high stability of a raw material.

According to the present invention, there is no limitation in the amount of a solvent but, from the economical point of view, it is preferred to employ the solvent in an amount less than ten times the amount of the alkali metal salt of a p-hydroxybenzoic acid alkyl ester employed as a raw material. In case the solvent is used in combination, it may be employed in any composition. The reaction temperature may be varied in the range of 100 to 240° C., preferably 150 to 220° C. The reaction time varies depending on the conditions employed. For example, the following Table 3 shows the change following the lapse of reaction time with regard to a yield in the case where methyl p-hydroxybenzoate is employed as solvent.

TABLE 3

| Reaction time (hr.): | Yield (percent) |
|---|---|
| 0.25 | 36.3 |
| 0.50 | 60.0 |
| 1.00 | 68.6 |
| 1.50 | 69.0 |

(sodium salt of methyl p-hydroxybenzoate 8.7 g.: methyl p-hydroxybenzoate 2.0 g.: ethylene dichloride 2.5 g.: reaction temperature 180° C.)

As is apparent from Table 3, the reaction of this case reaches equilibrium in 1 hour. Meanwhile, it is noted that, according to this invention, the reaction may be conducted by adding the other solvent, especially a polar solvent, in an amount as much as the adverse effect does not occur in the reaction.

The isolation of the desired product obtained in accordance with the present invention can be performed with great ease and can be effected by employing various methods. For example, in one way, after the reaction the solvent such as toluene or xylene is added and the alkali chloride formed as by-product and the catalyst, if employed, are filtered off under the heated condition, followed by the fractional distillation of the filtrate to give the desired product. In another way, the reaction mixture is washed with water to remove, for example sodium chloride formed as by-product, whereupon the recrystallization from toluene is effected to obtain the desired product as white crystal.

The following examples are given only for the purpose of illustrating this invention and should not be construed as limiting the scope thereof.

EXAMPLE 1

8.9 g. of sodium salt of methyl p-hydroxybenzoate and 2.5 g. of ethylene dichloride were charged into an autoclave having a capacity of 100 ml. and then the reaction was allowed to proceed under the condition as shown in the foregoing Table 2. The yield of 1,2-bis(4-carbomethoxyphenoxy)ethane was determined every one hour by employing a gas chromatographic analysis. The results as shown in the Table 2 were obtained.

Analytical condition:
  Column; Silicon SE-52 3%: 1.5 m.
  Temperature of column: 255° C.
  Temperature of detector: 255° C.
  Temperature of inlet: 300° C.
  Carrier gas: $N_2$
  Indicator: FID

EXAMPLE 2

8.7 g. of sodium salt of methyl p-hydroxybenzoate, 2.0 g. of methyl p-hydroxybenzoate and 2.5 g. of ethylene dichloride were charged into an autoclave having a capacity of 100 ml. and then were heated while stirring at 180° C. for 1 hour. After completion of the reaction, 100 g. of toluene were added, whereupon the filtration was effected at a temperature of 105° C. The filtrate was subjected to a reduced pressure distillation to distill off toluene. The residue was subjected to a fractional distillation to obtain 4.0 g. of methyl p-hydroxybenzoate as a fraction boiling at 126 to 128° C./1.3 mm. Hg and subsequently obtained 8.3 g. of 1,2-bis(4-carbomethyoxyphenoxy)ethane as a fraction boiling at 245 to 250° C./1.1 mm. Hg. The yield and the selectivity were 70% and 95%, respectively.

EXAMPLE 3

9.5 g. of potassium salt of methyl p-hydroxybenzoate, 3.0 g. of methyl p-hydroxybenzoate and 2.5 g. of ethylene dichloride were charged into an autoclave having a capacity of 50 ml. and heated to react at 160° C. for 3 hours. After the reaction, 40 ml. of methanol were added, whereupon the content of the autoclave was taken out and methanol was distilled off. The residue was again washed with 40 ml. of methanol. Then, the filtration residue was washed with 50 ml. of water and subjected to a drying under reduced pressure. There were obtained 5.78 g. of 1,2-bis,4-carbomethoxyphenoxy)ethane, which were found to have a purity of approximately 100% as a result of a gas chromatographic analysis. The yield and the selectivity were 70% and 96%, respectively.

EXAMPLE 4

The same operation as described in Example 3 was repeated with exception that lithium salt of methyl p-hydroxybenzoate was employed in place of potassium salt of methyl p-hydroxybenzoate. As a result, 1,2-bis(4-carbomethoxyphenoxy)ethane was obtained in a yield of 70%.

EXAMPLE 5

16.5 g. of sodium salt of methyl p-hydroxybenzoate, 16.0 g. of methyl p-hydroxybenzoate and 2.8 g. of ethylene dichloride were charged into an autoclave having a capacity of 100 ml. and were heated with stirring at 160° C. for 3 hours. After the reaction, 80 g. of methanol were added, whereupon the content of the autoclave was taken out, followed by the filtration. The filtration residue was washed with 80 g. of methanol and subsequently with 100 ml. of water and then, was subjected to a drying under reduced pressure. There were obtained 11.7 g. of 1,2-bis(4-carbomethoxyphenoxy)ethane, which were found to have a purity of 99.5% as a result of a gas chromatographic analysis. The yield and the selectivity were 71% and 96%, respectively.

EXAMPLE 6

8.7 g. of sodium salt of methyl p-hydroxybenzoate, 2.5 g. of ethylene dichloride and 2.0 g. of methyl (2-chloroethoxy)benzoate were charged into an autoclave having a capacity of 100 ml. and were heated with stirring at 160° C. for 3 hours. After the reaction, 60 g. of methanol were added, whereupon the content of the autoclave was taken out, followed by the filtration off of methanol. The filtration residue was washed with 20 g. of methanol and subsequently with 50 ml. of water and then, was subjected to a drying under reduced pressure. There were obtained 6.61 g. of 1,2-bis(4-carbomethoxyphenoxy)ethane. The yield and the selectivity were 67% and 92%, respectively.

EXAMPLE 7

8.7 g. of sodium salt of methyl p-hydroxybenzoate, 2.5 g. of ethylene dichloride and 2.0 g. of 1,2-bis(4-carbomethoxyphenoxy)ethane were charged into an autoclave having a capacity of 100 ml. and were heated with stirring at 180° C. for 3 hours. After the reaction, 20 g. of methanol were added, whereupon the content of the autoclave was taken out, followed by the filtration off of methanol. The filtration residue was washed with 20 g. of methanol and subsequently with 50 ml. of water and then, was subjected to a drying under reduced pressure. There were obtained 7.35 g. of 1,2-bis(4-carbomethoxyphenoxy)ethane, which were found to have a purity of approximately 100% as a result of a gas chromatographic analysis. The yield and the selectivity were 65% and 95%, respectively.

EXAMPLE 8

8.7 g. of sodium salt of methyl p-hydroxybenzoate, 2.0 g. of methyl p-hydroxybenzoate and 2.5 g. of ethylene dichloride were charged into an autoclave having a capacity of 100 ml. and were heated with stirring at 220° C. for 15 minutes. After the reaction, 40 g. of methanol were added, whereupon the content of the autoclave was taken out, followed by the filtration off of methanol. The filtration residue was washed with 40 g. of methanol and subsequently with 50 ml. of water and then, was subjected to a drying under reduced pressure. There were obtained 5.47 g. of 1,2-bis(4-carbomethoxyphenoxy)ethane. The yield and the selectivity were 65.5% and 92%, respectively.

EXAMPLE 9

348 g. of sodium salt of methyl p-hydroxybenzoate, 80 g. of methyl p-hydroxybenzoate and 100 g. of ethylene dichloride were charged into an autoclave having a capacity of 1 liter and were heated with stirring at 180° C. for 2 hours. After the reaction, 1,200 g. of methanol were added, whereupon the content of the autoclave was taken out, followed by the filtration off of methanol. The filtration residue was washed with 400 g. of methanol and subsequently with 1,500 g. of water and then, was subjected to a drying under reduced pressure. There were obtained 222 g. 1,2-bis(4-carbomethoxyphenoxy)ethane, which were found to have a purity of 99.8% as a result of a gas chromatographic analysis. The yield and the selectivity were 67% and 95%, respectively.

EXAMPLE 10

17.4 g. of sodium salt of methyl p-hydroxybenzoate, 5.00 g. of ethylene dichloride and methyl p-hydroxybenzoate were charged into an autoclave having a capacity of 100 ml. In addition, 0.16 g. of copper powder as catalyst were charged. Whereupon, the heating was effected at 180° C. for 1.5 hours, followed by cooling. After the cooling, 100 g. of methanol were added and then, the content of the autoclave was taken out, followed by the filtration. The residue was washed with 100 g. of methanol, and further washed with 100 g. of water to remove sodium chloride formed as by-product, followed by drying. As a result of a gas chromatographic analysis, it was found that 1,2-bis(4-carbomethoxyphenoxy)ethane was obtained in a yield of 80% with a selectivity of 97%.

EXAMPLE 11

20.4 g. of potassium salt of ethyl p-hydroxybenzoate, 5.00 g. of ethylene dichloride and 16.0 g. of ethyl p-hydroxybenzoate were charged into an autoclave having a capacity of 100 ml., to which were further added 0.204 g. of copper powder as catalyst. Whereupon, the heating was effected at 180° C. for 2 hours. Thereafter, the same treatment as described in Example 8 was conducted. As a result of a gas chromatographic analysis, it was found that 1,2-bis(4-carboethoxyphenoxy)ethane was obtained in a yield of 78% with a selectivity of 96%. By contrast, in case the same reaction was effected without adding copper powder, the yield of the desired product was 65 to 68%.

EXAMPLE 12

The same operation as described in Example 10 was repeated with exception that bronze powder was employed in place of copper powder. The yield of 1,2-bis(4-carbomethoxyphenoxy)ethane was 78%.

EXAMPLE 13

The same operation as described in Example 11 was repeated with exception that Devarda's alloy powder was employed in place of copper powder. The yield of 1,2-bis(4-carboethoxyphenoxy)ethane was 77%.

What is claimed is:

1. A process for the preparation of 1,2-bis(4-carboalkoxyphenoxy) ethane of the formula

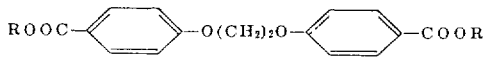

where R is a lower alkyl group having 1 to 5 carbon atoms, by the reaction of (A) an alkali metal salt of p-hydroxybenzoic acid alkyl ester of the formula

wherein R has the same meaning as defined above and M is an alkali metal atom, with (B) ethylene dichloride, at a temperature above 100° C., wherein the improvement comprises initiating said reaction by mixing said salt and said ethylene dichloride in the absence of a solvent.

2. A process as claimed in claim 1, wherein there is additionally present in the reaction mixture a catalyst selected from the group consisting of copper metal and a metallic composition containing copper metal.

3. A process as claimed in claim 2, wherein said catalyst is employed in an amount of 0.01 to 100% by weight, based on the amount of alkali metal salt of a p-hydroxybenzoic acid alkyl ester.

4. A process as claimed in claim 1, wherein said reaction is effected at a temperature of 100 to 240° C.

5. A process for the preparation of 1,2-bis(4-carboalkoxyphenoxy) ethane of the formula

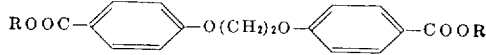

wherein R is a lower alkyl group having 1 to 5 carbon atoms, by the reaction of (A) an alkali metal salt of p-hydroxybenzoic acid alkyl ester of the formula

wherein R has the same meaning as defined above and M represents an alkali metal atom, with (B) ethylene dichloride, at a temperature above 100° C., wherein the improvement comprises initiating said reaction by mixing said salt and said ethylene dichloride in the presence of a solvent selected from the group consisting of p-hydroxybenzoic acid alkyl ester of the formula

wherein R has the same meaning as defined above, (2-chloroethoxy)benzoic acid alkyl ester of the formula

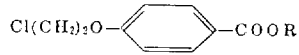

wherein R has the same meaning as defined above, 1,2-bis(4-carboalkoxyphenoxy)ethane of the formula

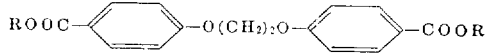

wherein R has the same meaning as defined above, and mixtures thereof.

6. A process as claimed in claim 5, wherein there is additionally present in the reaction mixture a catalyst selected from the group consisting of copper metal and a metallic composition containing copper metal.

7. A process as claimed in claim 6, wherein said catalyst is employed in an amount of 0.01 to 100% by weight, based on the amount of alkali metal salt of a p-hydroxybenzoic acid alkyl ester.

8. A process as claimed in claim 4, wherein said reaction is effected at a temperature of 100 to 240° C.

References Cited

Donahoe et al.: J. Org. Chem., 26, 474 (1961).

LORRAINE A. WEINBERGER, Primary Examiner

J. F. TERAPANE, Assistant Examiner

U.S. Cl. X.R.

260—75 R, 78 R